Feb. 11, 1969     D. R. DILLEHAY     3,426,643
ELECTRO-MONITORING METHOD AND APPARATUS
Original Filed May 11, 1965     Sheet 2 of 2
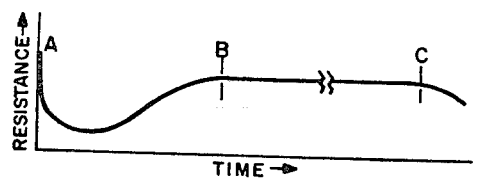
FIG_5_
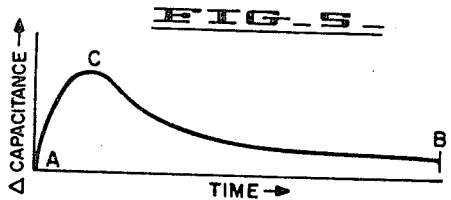
FIG_6_
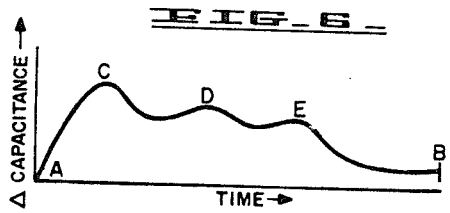
FIG_7_
DAVID R. DILLEHAY
*INVENTOR.*
BY Thos N. Brennan
AGENT 3,426,643
ELECTRO-MONITORING METHOD
AND APPARATUS
David R. Dillehay, Marshall, Tex., assignor to Thiokol
Chemical Corporation, Bristol, Pa., a corporation of
Delaware
Original application May 11, 1965, Ser. No. 454,953.
Divided and this application Aug. 24, 1967, Ser. No.
677,827
U.S. Cl. 86—1                    4 Claims
Int. Cl. F42b 33/00

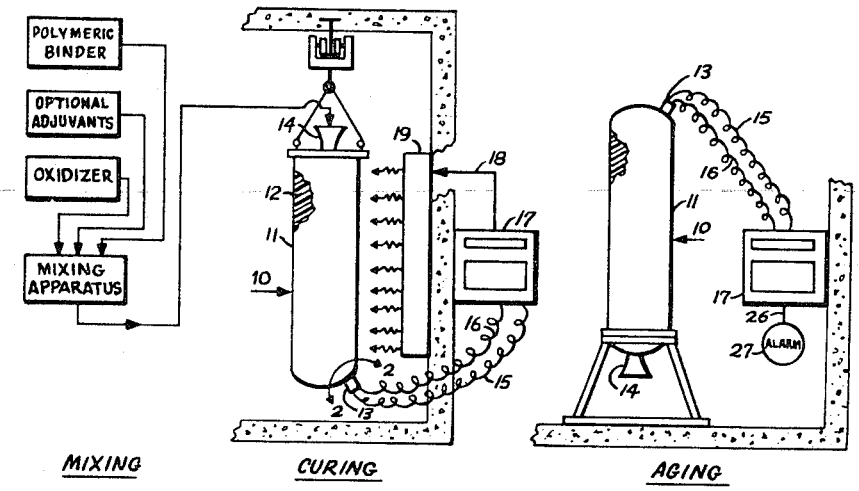

ABSTRACT OF THE DISCLOSURE

An apparatus for determining the state of cure of a solid propellant grain by measuring preselected electrical properties thereof during the curing cycle to maintain a predetermined rate of cure. The electrical property measurements are in the form of one or more electrical signals which are thereafter utilized in a controlling device to vary a heating source producing the cure.

---

This application is a division of co-pending application of David R. Dillehay, Ser. No. 454,953 filed May 11, 1965, now abandoned for Electro-monitoring Method for Apparatus.

This invention relates to a method and apparatus for determining characteristics of a solid propellant composition at any instant during curing and aging through monitoring an electrical property of the propellant composition. It also relates to a process control for maintaining cured propellant characteritics within predetermined limits by controlling the curing process through monitoring an electrical property of the propellant composition.

In the production of solid propellant rocket motors and related gas generators, for example, it is common practice to employ either a batch type or a continuous process in which there is intimately admixed a solid oxidizer, such as ammonium and other perchlorates, with a polymeric fuel-binder material such as polysulfides, epoxy or hydrogen-containing isocyanates, polyesters and polyalkadines, used either by themselves or their copolymers or terpolymers. A suitable curing agent is generally incorporated in the polymeric binder, except when using a self-curing binder material, and is considered herein as part of the binder itself. At times, optional adjuvants such as solvents, catalysts, modifying agents including metal powders (i.e., aluminum) fillers or plasticizers are included in the admixture. The resulting composition is cast, or extruded, into a casing where it is heat-cured at a constant elevated temperature until a solid elastomeric grain is formed.

It is desirable that the cured propellant grain possess good initial physical and chemical properties which, for example, include relatively high values of tensile, compressive and shear strengths, modulus of elasticity, potential energy and burning rate, as well as resistance to aging during shelf or service life. Aging, or degradation as it is sometimes referred to, consists primarily of chain scission of polymeric materials after curing, a general deterioration of propellant physical characteristics, a loss of potential energy and a reduction in capability of converting the potential energy into thrust.

A major problem which has existed in the manufacture of solid propellant rocket motors is that of maintaining propellant characteristics within close limits during processing and storage. Variations frequently occur in raw material properties, their concentrations in formulations and their quality of initial processing. Such variations modify curing rates and reaction conditions and have direct effects upon cured propellant characteristics. At times, this produces substandard physical in addition to accelerated aging conditions. Rocket motors so produced are rejected upon such occurrences whether it be immediately after curing or at some time later during its service life. This is done for safety reasons, however, at substantial economic losses in both manpower and materials. Thus, it would seem desirable to improve the cured propellant characteristcs to minimize the number of rejections as well as to extend the useful life of rocket motors found acceptable.

Prior attempts to improve the aforementioned conditions have been somewhat hampered by the lack of suitable method and apparatus for rapidly determining the physical characteristics of a propellant composition at any instant during curing and aging. Since the curing procedure is the last processing step where controls could be exercised to compensate for the aforementioned variations, it is highly desirable to know at all times, the state of cure of the propellant composition. Heretofore, a variety of procedures were employed to make selected determinations at different intervals throughout the curing and aging history of the propellant. For example, it has been customary to periodically determine the propellant composition state of cure through chemical titration of liquid samples taken up to the gel point during initial curing procedures. Thereafter, samples could no longer be withdrawn and information was absent until immediately after curing. At this point, a different technique was employed where cured propellant specimens were tested in appropriate apparatus for determining their respective physical and chemical characteristics. Aging, a more difficult and time-consuming determination to make, has in the past been made in a variety of ways. For example, this has been accomplished by periodic testing of propellant specimens for physical and chemical characteristics and observing changes therein: through visual inspection of the propellant grain and detecting flaws therein: and measuring and analyzing volatile gaseous by-products of deterioration. Thus, it can be understood why these cumbersome, time-consuming and, at times, inaccurate procedures proved ineffectual for contemporary production purposes.

It is therefore, an object of this invention to provide a method and apparatus for instantaneously determining characteristics of a solid propellant composition during manufacture and storage.

Another object of this invention is to provide a method for instantaneously determining and controlling the cured characteristics of a propellant composition during manufacture so as to effect improved post-cure characteristics and life of the propellant composition.

Still another object of this invention is to provide a method for instantaneously determining and controlling characteristics of a solid propellant by determining and controlling its electrical properties.

A further object of this invention is to provide a means for rapidly determining electrical properties of a propellant composition during curing and aging coupled with means for maintaining the electrical properties within a predetermined range.

A still further object of this invention is to provide means for rapidly determining electrical properties of a propellant composition during curing and aging through monitoring resistance, conductance or dielectric properties of the propellant.

Yet another object of this invention is to provide means for rapidly determining dielectric properties of a propellant composition which means is unaffected by the conductivity or electrolytic effects of said propellant composition.

Other objects and features of the present invention will become apparent from the following description taken in conjunction with the accompanying drawing in which:

FIGURE 1 illustrates diagrammatically a system for carrying out the invention;

FIGURES 2 and 4 are detail sectional views of electrical property detectors used in FIGURES 1 and 3, respectively;

FIGURE 3 is an elevation view of additional apparatus useful for monitoring electrical properties of propellant compositions;

FIGURES 5, 6, and 7 are graphic illustrations of electrical properties of various propellant compositions during curing, FIGURE 5 also including said property during aging.

Generally, this invention contemplates following changes in characteristics of a solid propellant composition as it cures and ages through monitoring its electrical properties during said passage of time. The electrical properties referred to herein include resistance, conductance, and dielectric properties, and when the propellant composition admits of it, its magnetic properties. It has been discovered that these electrical properties traverse a repeatable patern during curing and aging. It has also been discovered that variations occurring in raw material properties, formulations, or processing methods cause deviations in prescribed patterns as well as having a direct effect upon the quality of the cured propellant. The monitored electrical properties are correlated with characteristics of the propellant composition. This correlation has been utilized to conveniently determine the extent of curing and aging at any instant and to effect a process control for improving the quality of cured propellant compositions.

Referring to FIGURE 1, there are shown major stops in a process for manufacturing and storing solid propellant rocket motors which incorporates an embodiment of the present invention. Known propellant ingredients such as the type previously mentioned and consisting essentially of a solid oxidizer, a polymeric fuel binder material, including a suitable curing agent where required, and optional adjuvants are delivered in suitable proportions to mixing apparatus (un-identified) and mixed under conventionally prescribed conditions. Thereafter, the resulting composition is discharged from the mixing apparatus and cast in rocket motor 10 where it is contained in casing 11 and later cured to an elastomeric grain 12.

At the time of casting, rocket motor 10 is fitted with means for monitoring an electrical property of the propellant composition during curing and aging. Several electrical properties have been successfully monitored which include resistance, conductance and dielectric properties. Of these, monitoring of resistance properties is preferred because of the ease and simplicity of obtaining fairly accurate signal information over long periods of time. To effect this, some of the propellant composition is brought into contact with resistance detector 13 where it remains during curing and aging. Resistance detector 13 is detailed in FIGURE 2, but for purposes of illustration in FIGURE 1 is shown affixed to the exterior head-end of casing 11. However, it may be located elsewhere respective the propellant, as for example within casing 11 at the aft end of grain 12. Additionally, it may be inserted in a separately cast specimen which may be positioned in the opening of nozzle 14. The actual location of resistance detector 13 must be such as to provide an output signal representative of propellant conditions during curing and aging.

Still referring to FIGURE 1, resistance detector 13 is connected by conductors 15 and 16 to recording-controller 17, a commercially available instrument having a self-balancing resistance bridge measuring circuit arranged to include detector 13 in one of its bridge arms. This arrangement makes recording-controller 17 continuously responsive to propellant resistance and causes the production of a recording trace proportional to said resistance during the passage of time. It has been discovered during curing and aging that propellant resistance varies according to prescribed patterns as for example, between points A and B of FIGURES 5 and 6; that a correlation exists between propellant resistance and its physical properties; and that variations in raw materials, formulations or processing as previously mentioned causes deviations in normal resistance values and corresponding physical properties of the propellant. Thus, by observing the recording trace resistance determinations may be made of propellant state-of-cure during the curing period and the extent of aging and remaining service life during the storage period.

In another aspect of this invention, recording-controller 17 is equipped with conventional control means for providing a control signal proportional to the difference between resistance values of the propellant composition as it cures and ages and a correlation standard programmed simultaneously during the same periods. This control signal is delivered over circuit 18 to curing heat source 19, the latter being adapted to vary its heat output responsive said control signal to maintain the curing propellant composition within about 100° F. to about 300° F. When prescribed formulating and prior processing conditions are attained, heat source 19 is ordinarily maintained at a prescribed temperature level throughout a given curing period. This period may range up to about 80 hours or more and is determined by the requirements of each particular propellant mass and composition to produce the desired cured physical properties. Meanwhile, propellant resistance traverses a prescribed pattern and in this instance, does not cause recording-controller 17 to vary heat source 19 from the prescribed temperature level.

When variations occur in raw materials, formulations or prior processing procedures, normal curing rates vary proportionally thereto and correspondingly cause propellant resistance to deviate from its prescribed pattern. Ordinarily, variations in curing rates within a given curing period would either under-cure or over-cure the propellant composition and have an adverse effect upon its cured properties. However, the deviation in propellant resistance causes recording-controller 17 control means to modulate either the temperature level or the duration of heat source 19, or both depending upon the magnitude of deviation, so that an increase in temperature level or duration accompanies a decrease in curing rate, and vice versa. This alters the curing reaction rate or duration, or both, to achieve the desired cured properties of the propellant and improves what would be an otherwise undesirable resistance to aging.

After curing, rocket motor 10 is transported to a storage area where the same means for monitoring an electrical property of the propellant composition during curing is utilized to monitor aging properties thereof during shelf or service life. In this instance, resistance detector 13 remains connected to recording-controller 17 and causes the production of a recording trace during aging having a prescribed pattern exemplified in FIGURE 5 beyond point B. The signals from resistance detector 13 may alternatively be connected to the input of a tape recorder or computer (unidentified) whereby determinations of propellant aging properties may be had through electronic signal evaluation and analysis in addition to, or in place of, a continuous direct indication from recording-controller 17. This may be carried out periodically by including timing apparatus in recording-controller 17, thereby minimizing the amount of correlation necessary to make such determinations.

During aging, control signals are supplied by the control means of recording-controller 17 in a manner similar to those during curing, i.e., a signal proportional to deviation of aging resistance properties from defined limits. However, the control signal is utilized in this instance to activate degradation alarm 27 through circuit 26 instead of modulating heat source 19 as during curing.

In FIGURE 2, there is shown a detail sectional view of resistance detector 13. This assembly consists essentially of a pair of oppositely spaced steel wire electrodes 20 and 21 supported from an elongated body 22 of good electrical insulating material shown threadably engaged with casing 11. One end of electrodes 20 and 21 are respectively connected to conductors 15 and 16 at one end of elongated body 22. The other ends of said electrodes project beyond the opposite end of body 22 and into contact with propellant grain 12 for the purpose of measuring propellant resistance therebetween. In massive rocket motors, it may be desirable to detect propellant resistance at more than one location in grain 12 in order to obtain a suitable representative measurement. In such instances, a resistance detector 13 should be used at each location and their respective electrodes 20 and 21 connected in parallel through conductors 15 and 16, respectively. The impedance bridge measuring circuit in recording-controller 17 must, of course, be modified to accommodate a plurality of resistance detectors in one or more of its bridge arms.

While reference was made in the foregoing description, to monitoring of propellant resistance properties, it should be noted that monitoring of conductance properties will produce substantially the same results. To effect this, a conductance detector is substituted for resistance detector 13 and a conductance bridge and companion standard in the control means of recording-controller 17 are substituted for resistance circuitry. Other means remain substantially the same as in FIGURES 1 and 2.

Turning now to FIGURE 3 there is illustrated another embodiment of the present invention and shown as an elevation view of apparatus for monitoring dielectric properties of a propellant composition. Although this apparatus is depicted in the curing step of manufacture, its use may be extended to include the propellant aging period as well. It will be appreciated that dielectric monitoring may be substituted for resistance monitoring and achieve improved sensitivity and perhaps better accuracy of measurement, but at a sacrifice in ease and simplicity of making such measurements per se and especially over a long period of time.

A propellant composition resulting from mixing essential ingredients according to the procedure described for the FIGURE 1 embodiment is delivered to, and cast in, rocket motor 10. At the time of casting, the propellant composition is brought into contact with dielectric detector 23 where it remains during curing and aging. Dielectric detector 23 is detailed in FIGURE 4 and although illustrated in FIGURE 3 as being affixed to the exterior head-end of casing 11, it may be located elsewhere. In fact, a plurality of such detectors may also be used in massive propellant grains. The actual location and restrictions and conditions for use of dielectric detector 23 are substantially the same as previously described for resistance detector 13.

Dielectric detector 23 is connected by coaxial cable 24 to recording-controller 25, a commercial instrument which includes a chemical oscillometer for measurement purposes. The oscillometer relies upon a high frequency oscillator as a power source, the reasonant circuit of which is operative as a measuring circuit at a nominal frequency and capacitively couples dielectric detector 23 therein. This arrangement advantageously provides isolation of the propellant composition from conductive circuit elements, thereby leaving the measuring circuit responsive to capacitive elements. It consequently eliminates unwanted influence of electrode potentials and electrolytic alteration present in conventional high or low frequency dielectric constant bridge circuits.

As will be described later, dielectric detector 23 is actually a variable condensor consisting essentially of a fixed capacitance cell having the propellant composition as its principal dielectric material. Dielectric properties of the curing and aging propellant compositions have been discovered to very according to prescribed patterns, hence causing detector 23 capacitance to change accordingly as is exemplified during curing in FIGURE 7 between points A and B. This change 26 capacitance causes the resonant circuit to deviate proportionally from its nominal frequency and subsequently causes a self-balancing mechanism to alter the resonant circuit to restore it to said nominal frequency. This makes recording-controller 23 continuously responsive to propellant dielectric properties and causes the production of a recording trace proportional to propellant dielectric properties during the passage of time.

It has been further discovered during curing and aging that coupled with a change in capacitance there exists a correlation between propellant composition dielectric properties and its physical properties, and that variations in raw materials, formulations or processing as previously mentioned, causes deviations in normal dielectric property values and corresponding physical properties of the propellant composition. Hence, by observing the recording trace of dielectric properties, determinations may be made of propellant state-of-cure during the curing period as well as the extent of aging and service life during storage.

In another aspect of the FIGURE 3 embodiment, recording-controller 25 is equipped with conventional control means for providing a control signal proportional to the difference between dielectric property values of the curing and aging propellant composition and a correlation standard programmed simultaneously during the same periods. This control signal is delivered over circuit 33 to curing heat source 19 which is adapted to be varied by said control signal to maintain the curing propellant composition within defined limits substantially the same as described under resistance monitoring.

Ordinarily, during curing, the propellant composition dielectric property traverses a prescribed pattern and the control signal from recording-controller 25 maintains heat source 19 at a constant temperature level for a given duration and thereafter terminates said curing. When variations occur in curing rates as previously described, the propellant dielectric property deviates from its prescribed pattern. This causes recording-controller 25 control means to modulate either the temperature level or the duration of heat source 19, or both, so that an increase in temperature level or duration accompanies a decrease in curing rate, and vice versa. The curing reaction rate or duration is thus altered to achieve the desired cured properties of the propellant and obviates an accelerated aging condition.

After curing, rocket motor 10 is generally transported to a storage area where, if desired, dielectric monitoring may continue by utilizing the same apparatus. The recording trace exemplified by FIGURE 7 would continue asymptotically beyond point B until a noticeable drop-off occured which would signify the degradation point. The control signals supplied by recording-controller 25 during aging may be utilized as described under resistance monitoring for the same period.

FIGURE 4 shows a detail sectional view of dielectric detector 25, a variable condenser consisting essentially of a fixed capacitance cell having the propellant composition as its principal dielectric material. The capacitance cell consists of a pair of concentrically spaced cylindrical electrodes 28 and 29 joined at one end by an electrically insulating support 30 of good dielectric material such as glass, thereby forming a U-shaped annular cavity between the electrodes. One end of electrode 29 opposite support 30 is threadably engaged with casing 11 and also connected to outer conductor 31 of disconnectable coaxial cable 24. Electrode 28 being centrally located has its supported end connected to inner conductor 32 of cable 24.

Electrodes 28 and 29 are contacted by propellant grain 12 whereby portion 12' forms the principal dielectric material therebetween. As the propellant composition cures and ages, its dielectric properties change as previously mentioned and cause a corresponding change in capacitance of the capacitance cell.

The following specific examples will be helpful in understanding the invention but are not to be construed as limiting since they are intended to be exemplary.

*Example 1*

In one embodiment of this invention, resistance monitoring and process control are carried out on a well known solid propellant composition which includes an ammonium perchlorate oxidizer and a liquid polysulfide polymer binder cured by reduction of p-quinone dioxime to p-phenylene diamine with disulfide linkages. Essential ingredients of the propellant composition, consisting of 60 to 65% by weight of ammonium perchlorate and 30 to 35% of liquid polysulfide polymer having a molecular weight of about 1100, are intimately admixed, cast and then cured at 170° F. for about 24 hours using 5% by weight of the curing agent. A number of specimens are prepared including variations in raw materials properties, formulations and processing methods, the latter variations including both curing temperatures and length of curing cycle.

Electrical resistance measurements are carried out by contacting a pair of steel wire electrodes with the propellant composition at the time of casting and, by means of a resistance bridge connected thereto, recording the resistance as it occurred between the electrodes during the curing and aging cycles. Aging is accelerated by storing cured specimens at 200° F. and correcting resistance values to room temperature. FIGURE 5 shows a resistance pattern representative of a standard specimen and in which curing occurs between points A and B, aging between points B and C, and degradation thereafter. A typical resistance value at point B, for example, is 2 megohms when electrode spacing is 1½ inches. Thus, by observing the resistance recording and comparing it with that of the standard specimen of the propellant composition, a determination may be made of the propellant state-of-cure as well as its extent of aging.

Subsequent tests and analysis of the aforementioned specimens indicate that a correlation exists between propellant electrical resistance and its physical properties. Generally, it is noted that when curing resistance deviates from that of the standard specimen, so does initially cured physical properties, such as tensile strength, elongation and modulus of elasticity. Resistance to aging also deviates proportionally from its prescribed standards. Further, that variations in curing rates produce proportional variations in electrical resistance which subsequently has the aforementioned effects. For example, variations produced by an increase in raw material purity and concentration cause a decrease in electrical resistance and a proportional decrease in cured physical properties and resistance to aging. The opposite result accompanies a decrease in purity and concentration.

Further analysis and correlation of specimen electrical and physical properties show that resistance monitoring and control provides a useful procedure during the all-important curing cycle in assuring quality control of the cured propellant compositions. For example, when resistance monitoring indicates a low resistance value at the start of curing or a decreasing curing rate thereafter, a process control is instituted responsive to the difference between specimen resistance and that of the standard specimen to maintain curing resistance within predetermined limits. Depending upon the magnitude of resistance deviation, the process control modulates the curing heat source and effects either an increase in curing temperature to a safe level, or an extension of curing period, thereby avoiding undercuring. The converse is also true. As a result the quantity of cured propellant compositions is usually improved. In some instances it is possible to raise the physical properties of cured propellant compositions from an otherwise inferior level to one of acceptance, while in other instances propellant life is extended. The significance of this is that it offers a heretofore unrealized and unexpected means of salvaging articles such as gas generators and rocket motors destined for rejection.

*Example 2*

In another embodiment of resistance monitoring and process control, a similar group of ammonium perchlorate based solid propellant compositions are prepared, tested and analyzed essentially as in Example 1. However, in this instance, a polybutadiene-acrylic acid liquid copolymer binder material is cured by reaction of carboxyl groups with epoxy groups and additional crosslinking by reaction of the epoxy with secondary hydroxyls. This yields a standard specimen having a capacitance pattern presented in FIGURE 6. The curing cycle occurs between points A and B therein, whereas the aging cycle (not shown) is substantially the same as in FIGURE 5 beyond point B. The packing at point C in FIGURE 6 is representative of ring opening at a significant milestone in the curing cycle and is especially useful in precisely identifying a somewhat complex propellant composition as well as its state-of-cure. This is also useful in the time-rate programming of the process control and is attributable to achieving not only the same scope, but better results, than in Example 1.

*Example 3*

In yet another embodiment of this invention, dielectric monitoring and process control are carried out on another group of ammonium perchlorate based solid propellant compositions. In this instance, however, a polybutadiene liquid polymer binder material having carboxyl terminals only at opposite ends of its structure is cured by the reaction of its carboxyl groups with tris-[1,1,1-(2-methyl aziridinyl)] phosphine oxide, a trifunctional curing agent which produces a three-component curing phenomenon. Essential ingredients of the propellant composition, consisting of 65 to 70% by weight of ammonium perchlorate oxidizer, 14 to 18% by weight of a metal powder and 14 to 18% of the liquid polybutadiene polymer binder having a molecular weight of about 2400, are intimately admixed, cast and then cured at 155° F. for about 48 hours using 2% by weight of the curing agent. Numerous specimens are prepared using the materials and procedures set forth above in addition to variations in preparation and aging procedures, and tested, analyzed and correlated all according to the specifications given for the specimen of Example 1.

Dielectric propert measurements are obtained by contacting a capacitance cell with the propellant composition at the time of casting and by means of chemical oscillometry as previously described recording the capacitance changes reflecting dielectric properties as they occurred during curing and aging. This yields a standard specimen having a dielectric property pattern represented by FIGURE 7. Curing occurs between points A and B therein, whereas the aging cycle (not shown) extends beyond point B and the curve becomes asymptotic and later drops off noticeably to define a point of degradation.

The peaking in FIGURE 7 at points C, D and E are representative of ring openings in the three-component curing phenomenon and serves to precisely identify the electrical properties of this complex propellant composition over that of others. Moreover, it is useful in determining the state-of-cure as well as the time-rate programming of the aforementioned process control. The latter feature is particularly advantageous because there are three significant milestones starting early in the curing cycle whereby through dielectric monitoring and process control, the curing reaction is altered according to the needs of each component of the curing phenomenon. The results obtained for improving the quality of cured propellant compositions were heretofore unattainable and although equal in scope, are superior in degree, with the results obtained in the foregoing examples. It will be observed that dielectric monitoring produces more precise recording patterns and improvements from process controls but at a greater degree of difficulty than in resistance monitoring.

What is claimed is:

1. Apparatus for assuring quality control of a cured propellant composition, comprising:
    a controllable heat source for curing a liquid polymeric propellant composition to a solid grain having predetermined characteristics;
    means for monitoring an electrical property of the propellant composition during curing; and
    control means responsive to the monitoring means for controlling the curing process to maintain said electrical property within predetermined limits, thereby maintaining cured characteristics of the propellant grain within predetermined limits.

2. Apparatus according to claim 1 wherein the curing temperature is controlled by the heat source through monitoring said electrical property.

3. Apparatus according to claim 1 wherein the curing duration is controlled by the heat source through monitoring said electrical property.

4. Apparatus according to claim 1 wherein both the curing temperature and the curing duration are controllable by the heat source through monitoring said electrical property.

References Cited

UNITED STATES PATENTS

| 3,022,206 | 2/1962 | Hutchinson et al. | 149—19 |
| 3,159,076 | 12/1964 | Meissner | 86—20 |
| 3,361,964 | 1/1968 | Hanson et al. | 324—61 |

BENJAMIN A. BORCHELT, *Primary Examiner.*

GERALD H. GLANZMAN, *Assistant Examiner.*

U.S. Cl. X.R.

324—65